(12) United States Patent
Hostetter

(10) Patent No.: US 9,030,771 B2
(45) Date of Patent: May 12, 2015

(54) COMPRESSED DATA VERIFICATION

(71) Applicant: Oracle International Corporation, Redwood City, CA (US)

(72) Inventor: David G. Hostetter, Louisville, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/871,402

(22) Filed: Apr. 26, 2013

(65) Prior Publication Data

US 2014/0320996 A1 Oct. 30, 2014

(51) Int. Cl.
 *G11B 5/09* (2006.01)
 *G11C 29/00* (2006.01)
 *G11B 20/18* (2006.01)

(52) U.S. Cl.
 CPC .................................. *G11B 20/1816* (2013.01)

(58) Field of Classification Search
 None
 See application file for complete search history.

(56) References Cited

U.S. PATENT DOCUMENTS

2009/0208018 A1\* 8/2009 Buckingham et al. ........ 380/277
2012/0117040 A1  5/2012 Hostetter et al.

\* cited by examiner

*Primary Examiner* — Regina N. Holder
(74) *Attorney, Agent, or Firm* — Brooks Kushman P.C.

(57) ABSTRACT

A media drive includes drive side circuitry that, in response to a request to validate compressed data read from media, validates packets of the compressed data while compressed and, in response to detecting end of data on the media without having detected an unrecoverable corrupt one of the packets and without decompressing the compressed data, generates a message indicating that the compressed data read from the media has been validated.

17 Claims, 4 Drawing Sheets

COMPRESSED DATA VERIFICATION

TECHNICAL FIELD

This disclosure relates to verification of compressed data stored on media, such as tape media.

BACKGROUND

Media, such as magnetic tape, are frequently used for long-term storage of large quantities of data, such as in data backup or archiving operations. As more and more data are stored on media, users of such media may grow increasingly concerned that the data being stored is "good" (i.e., that the data has been successfully recorded on the media) so that it will be available for recovery and use at a later time. Users may thus periodically perform a verify step after data is stored or written to media.

SUMMARY

A media drive includes a head that reads compressed data from a media and at least one drive side application specific integrated circuit (ASIC). The ASIC validates packets of the compressed data while compressed in response to a request to validate the compressed data. The ASIC also generates a message indicating that the compressed data read from the media has been validated in response to detecting end of data on the media without having detected an unrecoverable corrupt one of the packets and without decompressing the compressed data.

A method for validating compressed data includes reading compressed data from a media, validating packets of the compressed data while compressed, and detecting end of data on the media. The method also includes generating a message indicating that the compressed data read from the media has been validated in response to detecting the end of data on the media without having detected an unrecoverable corrupt one of the packets and without decompressing the compressed data.

A media drive includes a head that reads compressed data from a media and drive side circuitry that, in response to a request to validate the compressed data, validates packets of the compressed data while compressed. The drive side circuitry also, in response to validating the packets without detecting an unrecoverable corrupt one of the packets, generates a message indicating that the compressed data read from the media has been validated.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
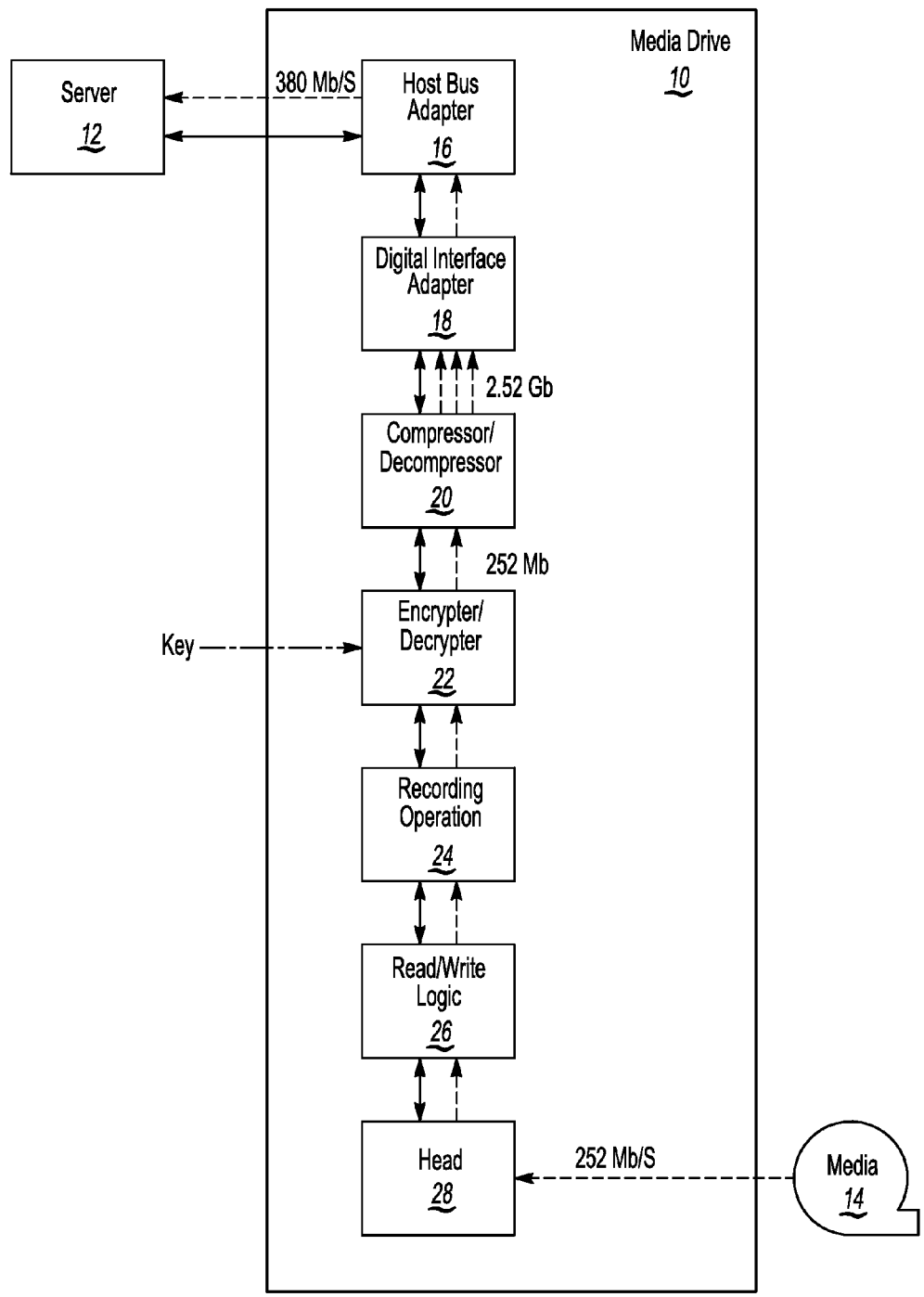
FIGS. 1 through 3 are block diagrams of drives arranged to read data from media and to communicate with servers.

Referring to FIG. 1, a media drive 10 is operatively arranged with a server 12 and media 14. That is, the server 12 may command the media drive 10 to read or write data from or to the media 14. The media drive 10 includes a host bus adapter 16, a digital interface adapter 18, a compressor/decompressor 20, and an encrypter/decrypter 22. The media drive 10 further includes a recording operation 24, read/write logic 26, and a head 28. Control/communication paths are shown in solid line and data paths are shown in dashed line.

As mentioned above, a user may perform a verify step to check whether stored data on the media 14 is good. The server 12, at the request of the user, may command the media drive 10 to read data from the media 14 and forward such data to the server 12 so that the server 12 may compare the data read from the media 14 to a known good copy. Differences between the two may indicate errors present in the data read from the media 14.

The server 12 commands the digital interface adapter 18 via the host bus adapter 16 to read data from the media 14. The digital interface adapter 18, in response, commands the recording operation 24 via the compressor/decompressor 20 and encrypter/decrypter 22 to position the head 28 at an appropriate location on the media 14 and to begin reading the data. In this example, the channel rate between the media 14 and the head 28 is 252 Megabytes per second and the channel rate between the server 12 and the host bus adapter 16 is 380 Megabytes per second. (Assume that when the data was written to the media 14, it was compressed with a 10:1 compression ratio and encrypted with a key.)

Of note is the fact that prior to the server 12 verifying the data read from the media 14, it must be decrypted and decompressed. 252 Megabytes of compressed data enters and 2.52 Gigabytes of uncompressed data exits the compressor/decompressor 20 for each second the recording operation 24 is active. The channel rate between the server 12 and the host bus adapter 16 is thus a bottleneck in the verification process.

If 5 Terabytes of data with a 10:1 compression ratio is stored on the media 14 and this data is to be verified, 50 Terabytes of data would need to be read by the media drive 10 and forwarded to the server 12. This would take approximately 36.5 hours—a considerable amount of time—at the 380 Megabytes per second rate. Such a transfer time may be costly, occupying significant server and communication resources.

The use of cloud storage technologies may further exacerbate issues associated with the data verification scheme of FIG. 1. Cloud networks may require the need for online data verification. Put a different way, online data verification may require significant bandwidth (at premium cost) to transfer data from the media drive 10 to the server 12.

To eliminate the need to transfer data read from a media drive to a server during a verification process, a media drive may be configured to verify checksums or cyclic redundancy checks (calculated when the data was being written) stored with logical records of the data. The media drive may generate the checksum for uncompressed data of a logical record and compare it to the checksum stored with the logical record.

Differences between the two may indicate errors present in the data read from the media. Moreover, the server is free to perform other duties while the verification process is executing. If the data has a verification problem, the server is notified via a message as to which logical record is bad. As a result, less data is sent from the media drive to the server for data verification or error check purposes.

Figure 2:
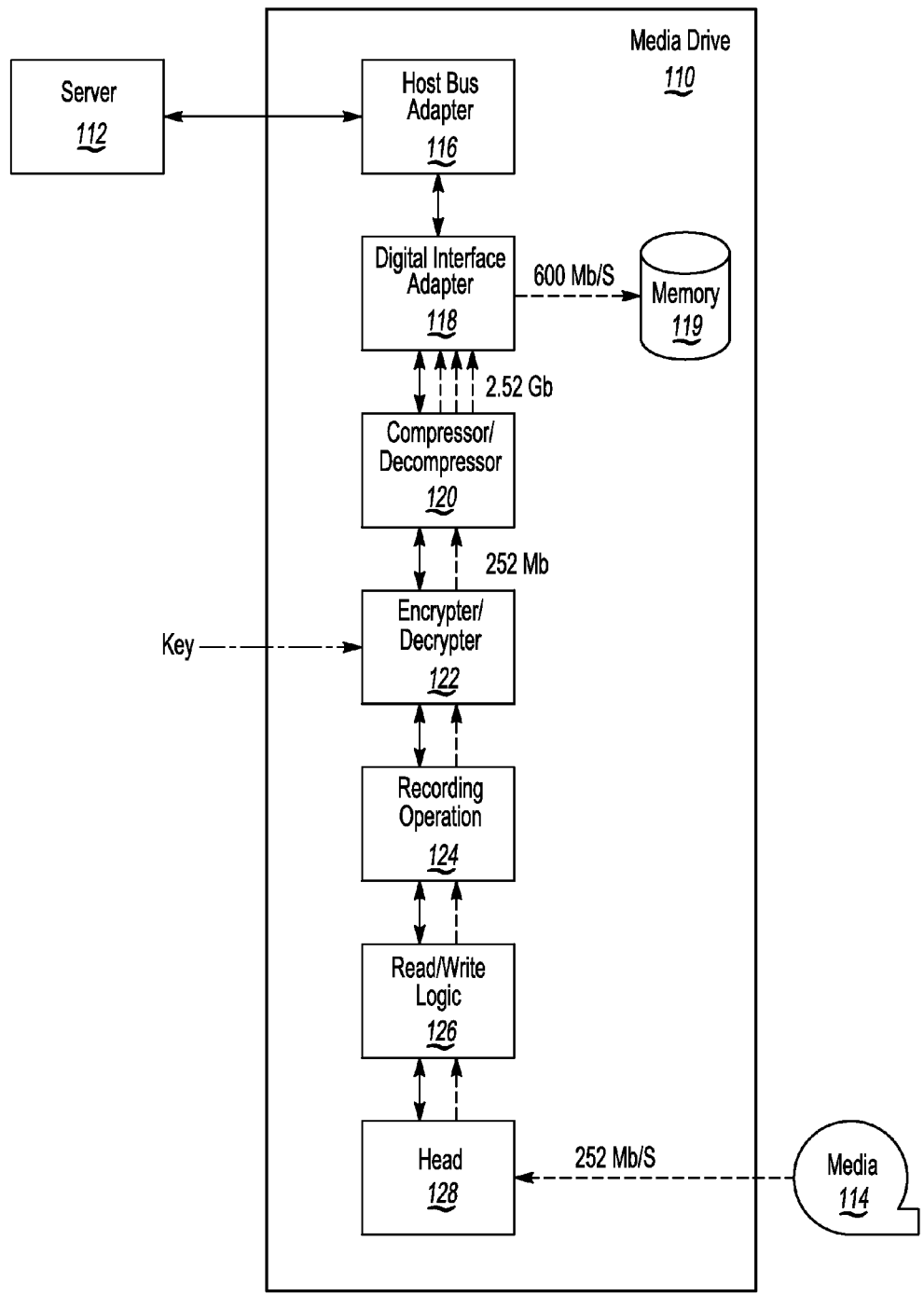

Referring to FIG. 2, a media drive 110 is operatively arranged with a server 112 and media 114. The media drive 110 includes a host bus adapter 116, a digital interface adapter 118, a memory 119 associated with the digital interface adapter 118, a compressor/decompressor 120, and an encrypter/decrypter 122. The media drive 110 further includes a recording operation 124, read/write logic 126, and a head 128. Control/communication paths are shown in solid line and data paths are shown in dashed line.

The server 112, at the request of a user, may command the media drive 110 to read and verify data from the media 114. The server 112 commands the digital interface adapter 118 via the host bus adapter 116 to read data from the media 114. The digital interface adapter 118, in response, commands the recording operation 124 via the compressor/decompressor 120 and encrypter/decrypter 122 to position the head 128 at an appropriate location on the media 114 and to begin reading the data (logical records and checksums). In this example, the channel rate between the media 114 and the head 128 is 252 Megabytes per second and the memory 119 can receive data at a rate of 600 Megabytes per second. (Assume that when the data was written to the media 114, it was compressed with a 10:1 compression ratio and encrypted with a key.)

Similar to the process described with reference to FIG. 1, the data read from the media 114 must be decrypted and decompressed prior to verification by the digital interface adapter 118. 252 Megabytes of compressed data enters and 2.52 Gigabytes of uncompressed data exits the compressor/decompressor 20 for each second the recording operation 124 is active. That is for each second the recording operation 124 is active, the digital interface adapter 118 must compare 2.52 Gigabytes of uncompressed data (logical records and checksums) read from the media 114 with generated checksums for the uncompressed data, and then pass this data to the memory at a rate of 600 Megabytes per second. The rate at which the memory 119 can receive data is thus a bottleneck in the verification process.

The actions described with reference to FIG. 2 appear as normal read operations for the media drive hardware and normal verify operations for associated firmware, which as a result discard the data of a logical record stored in the memory 119, cache, a buffer or other temporary memory and continue reading logical records from the media 114.

If 5 Terabytes of data with a 10:1 compression ratio is stored on the media 114 and this data is to be verified, 50 Terabytes of data would need to be verified by the digital interface adapter 118 and forwarded to the memory 119. This would take approximately 23 hours—a considerable amount of time—at the 600 Megabytes per second rate.

Although the verification scheme of FIG. 2 requires less time and eliminates the need to transfer data read from the media drive 114 to the server 112 relative to the verification scheme of FIG. 1, the time to complete the verification is still considerable and the data read from the media 114 must still be decrypted and decompressed prior to verification. Decrypting data may be impractical in certain arrangements because users of the data may not wish to share the key with those who manage the media drive tasked with the verification process.

To further reduce the time needed to verify data and eliminate the need to decrypt and decompress data read from a media drive during a verification process, a media drive may be configured to verify error correction codes (inner and/or outer) stored with compressed data and pass the compressed data to cache, a buffer or other temporary memory without the need to decrypt or decompress it. If the media drive detects end of data with no unverified error correction codes, a message may be sent to a server indicating that the data has been verified. If the media drive is unable to verify an error correction code, a message may be sent indicating that the data cannot be verified.

Recording operations of the media drive may divide the data into packets such that "X" number of packets forms a matrix. The resulting matrix is of size "N" bytes. As known in the art, each packet may be wrapped with an inner error correction code and an outer error correction code. Read/write channel hardware of the media drive may verify all packets when the matrix is read. If a packet is corrupt, it will attempt to fix it. This is done for all packets passing back to the recording operations. The recording operations take each of these packets and insert them into the proper location in its matrix. If a packet is damaged and cannot be fixed by the read/write channel hardware, then the recording operations hardware will use the outer error correction to try and fix the matrix. If the fix fails (because the packet is an unrecoverable corrupt packet), the data fails the verification step and a status message may be sent, for example, to a digital interface adapter of the media drive.

Figure 3:
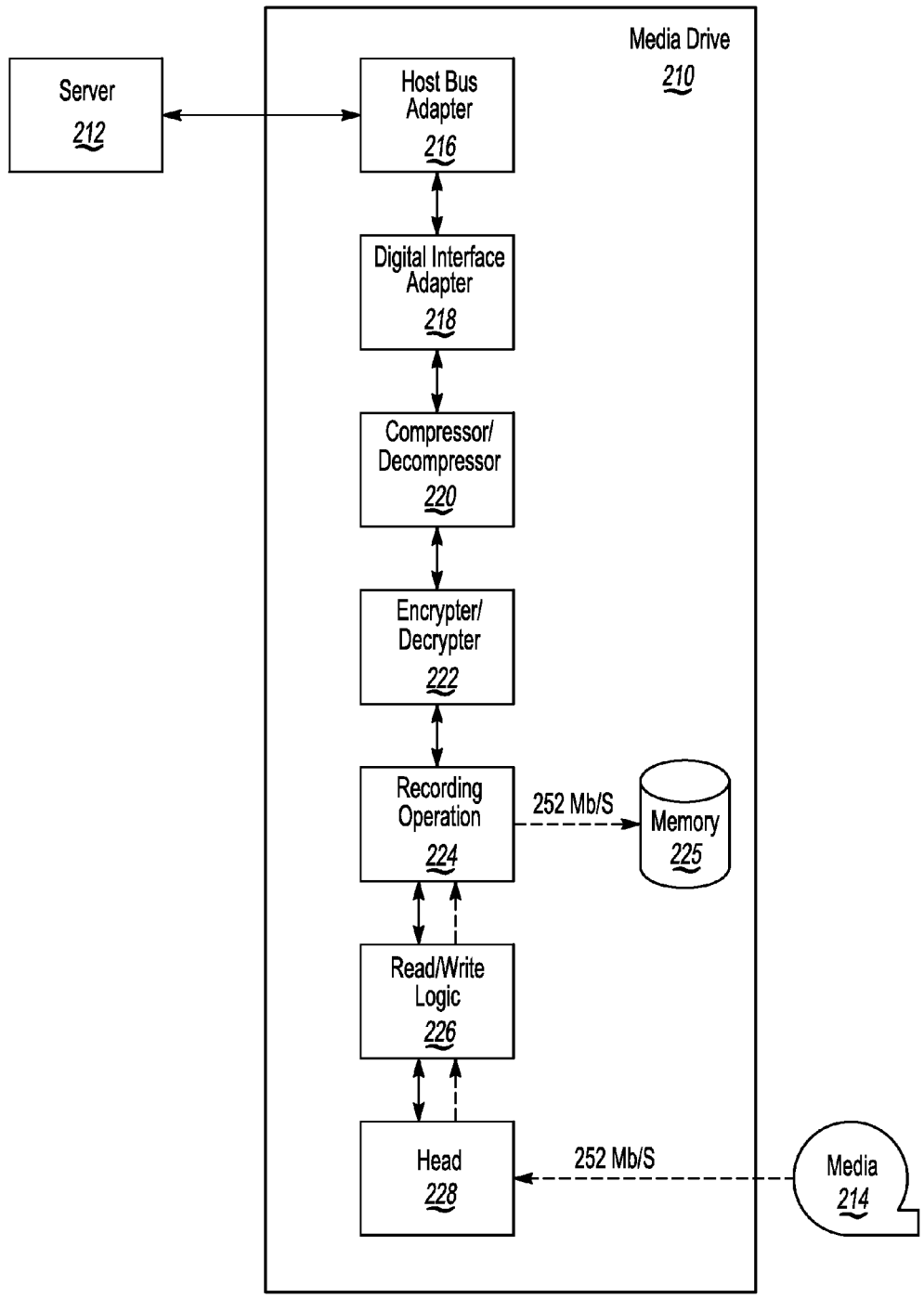

Referring to FIG. 3, a media drive 210 (e.g., a tape drive) is operatively arranged with a server 212 and media 214 (e.g., tape). The media drive 210 may include a host bus adapter 216, a digital interface adapter 218 (a server side application specific integrated circuit or the equivalent, software and/or firmware), a compressor/decompressor 220, and an encrypter/decrypter 222. The media drive 210 may further include a recording operation 224 (a drive side application specific integrated circuit or the equivalent, etc.), a memory 225 associated with the recording operation 224, read/write logic 226 (a drive side application specific integrated circuit or the equivalent, etc.), and a head 228. Control/communication paths are shown in solid line and data paths are shown in dashed line.

The server 212, at the request of a user, may command the media drive 210 to read and verify data from the media 214. The server 212 commands the digital interface adapter 218 via the host bus adapter 216 to read data from the media 214. The digital interface adapter 218, in response, commands the recording operation 224 via the compressor/decompressor 220 and encrypter/decrypter 222 to position the head 228 at an appropriate location on the media 214 and to begin reading the data. In this example, the channel rate between the media 214 and the head 228 is 252 Megabytes per second and the memory 225 can receive data at a rate of 600 Megabytes per second. Other rates are, of course, also possible. (Assume that when the data was written to the media 214, it was compressed with a 10:1 compression ratio and encrypted with a key.)

Unlike the processes described with reference to FIGS. 1 and 2, the data read from the media 214 need not be decrypted or decompressed prior to verification. 252 Megabytes of compressed data enters the read/write logic 226 and 252 Megabytes of compressed data exits the recording operation 224 for each second the recording operation 224 is active. That is for each second the recording operation 224 is active, the read/write logic 226 may verify inner error correction codes and the recording operation 224 can verify outer error correction codes associated compressed data read from the media 214, and then pass this data to the memory 225 at a rate of 252 Megabytes per second, where it can be written over repeatedly. No bottlenecks exist in the system: the media drive 210 can verify the compressed data at the native speed of the media 214.

If 5 Terabytes of data with a 10:1 compression ratio is stored on the media 214 and this data is to be verified, 5 Terabytes of data would need to be verified by the recording operation 224 and read/write logic 226, and forwarded to the memory 225. This would take approximately 5.5 hours at the 252 Megabytes per second rate.

Table 1 summarizes some of the differences between the verification processes described with reference to FIGS. 1, 2 and 3:

TABLE 1

Data Verification Requirements and Performance Characteristics

| Type | Decryption Required? | Decompression Required? | Speed Limitation | Verification Times from Examples |
|---|---|---|---|---|
| Server compares data read to known copy | Yes | Yes | Rate at which data can be transferred to server | 36.5 hours |
| Digital interface adapter compares generated checksums to stored checksums | Yes | Yes | Rate at which memory associated with digital interface adapter can receive data | 23 hours |
| Recording operation and read/write logic verify error correction codes | No | No | Native media speed | 5.5 hours |

The data verification process described with reference to FIG. 3 may be implemented in a variety of media drives, some of which may be specifically configured for the verification process. In certain examples, a media drive may be constructed similar to that described with reference to FIG. 3 but lacking a compressor/decompressor and an encrypter/decrypter to save cost. As explained above, decryption and decompression is not necessary to perform the verification process and therefore, components configured to perform these activities may be omitted. Such verification specific drives may be useful to businesses engaged in long term storage of data. Certain tape media, for example, are stored within man-made caves. These caves may be outfitted with a verification-only media drive to facilitate on-site and relatively inexpensive verification of data. Other arrangements are also possible.

Figure 4:
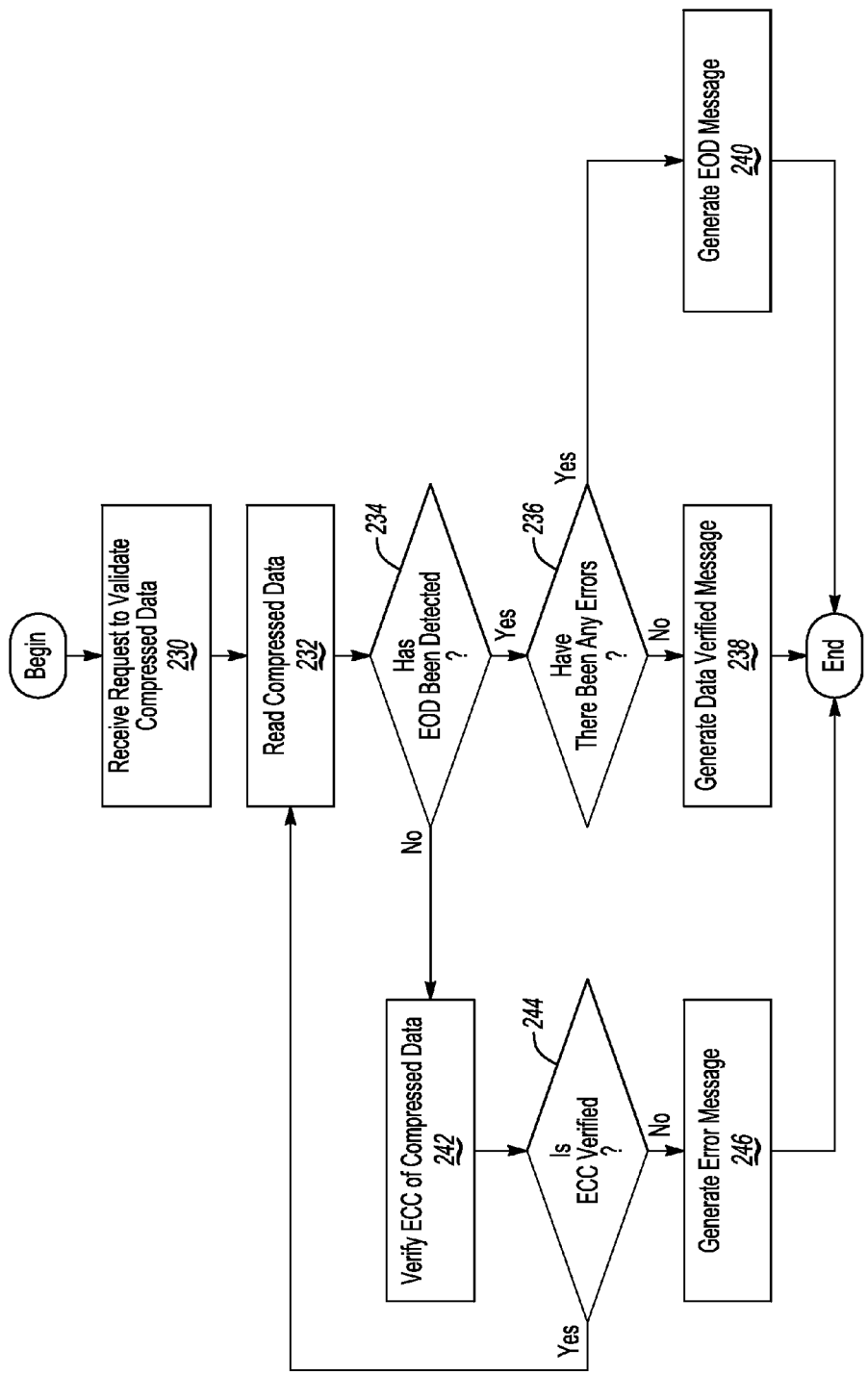
FIG. 4 is a flow chart of an algorithm for verifying compressed data.

Referring to FIGS. 3 and 4, a request to validate compressed data is received at operation 230. For example, the server 212 or another user may issue a validate request to the digital interface adapter 218. At operation 232, compressed data is read. The digital interface adapter 218, for example, may command the recording operation 224 to get compressed data from the media 214. In response, the recording operation 224 may command the head 228 to position itself at an appropriate location over the media 214 and begin to read compressed data therefrom. At operation 234, it is determined whether end of data has been detected. For example, the recording operation 224 may determine whether end of data associated with the media 214 has been detected. If end of data has been detected, it is determined whether there have been any errors at operation 236. The recording operation 224, for example, may determine whether it has generated any error messages. If no error messages have been generated, a data verified message is generated at operation 238.

The recording operation 224, for example, may generate a data verified message and send it to the digital interface adapter 218. The digital interface adapter 218 may then forward this data verified message to the server 212. If error messages have been generated, an end of data message is generated at operation 240. The recording operation 224, for example, may generate an end of data message and send it to the digital interface adapter 218. The digital interface adapter 218 may then forward this end of data message to the server 212.

If end of data has not been detected, at operation 242, error correction code of the compressed data is verified. At operation 244, it is determined whether the error correction code is verified. For example, inner error correction code associated with the compressed data read by the head 228 may be verified by the read/write logic 226. Outer error correction code associated with the compressed data may be verified by the recording operation 224. The compressed data read is then stored to memory 225. If the error correction code is verified, the algorithm returns to operation 232. If the error correction code is not verified, an error message is generated at operation 246. The recording operation 224, for example, may generate an error message and send it to the digital interface adapter 218. The digital interface adapter 218 may then forward this error message to the server 212.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A media drive comprising:
a head configured to read compressed data from a media; and
at least one drive side application specific integrated circuit (ASIC) configured to, in response to a request to validate the compressed data from a validator that did not write data forming the compressed data, validate packets of the compressed data while compressed, and in response to detecting end of data on the media without having detected an unrecoverable corrupt one of the packets and without decompressing the compressed data, generate a message for the validator indicating that the compressed data read from the media has been validated.

2. The media drive of claim 1 wherein the compressed data is encrypted.

3. The media drive of claim 1 wherein the at least one drive side ASIC has a speed at which it can validate compressed data approximately equal to a native speed of the media.

4. The media drive of claim 1 wherein the at least one drive side ASIC is further configured to, in response to detecting an unrecoverable corrupt one of the packets, generate a message indicating that the compressed data read from the media cannot be validated.

5. The media drive of claim 1 further comprising at least one server side ASIC, wherein the at least one drive side ASIC is further configured to forward the message to the at least one server side ASIC.

6. The media drive of claim 5 wherein the at least one server side ASIC is a digital interface adapter.

7. The media drive of claim 1 wherein the media is tape.

8. A method for validating compressed data comprising:
in response to a request to validate compressed data from a validator that did not write data forming the compressed data,
reading the compressed data from a media,
validating packets of the compressed data while compressed,
detecting end of data on the media, and
generating a message for the validator indicating that the compressed data read from the media has been validated in response to detecting the end of data on the media without having detected an unrecoverable corrupt one of the packets and without decompressing the compressed data.

9. The method of claim 8 wherein the compressed data is encrypted.

10. The method of claim 8 wherein a speed of validating packets of the compressed data is approximately equal to a native speed of the media.

11. The method of claim 8 further comprising generating a message indicating that the compressed data read from the media cannot be validated in response to detecting an unrecoverable corrupt one of the packets.

12. A media drive comprising:
a head configured to read compressed data from a media; and
drive side circuitry configured to, in response to a request to validate the compressed data from a validator that did not write data forming the compressed data, validate packets of the compressed data while compressed and, in response to validating the packets without detecting an unrecoverable corrupt one of the packets, generate a message for the validator indicating that the compressed data read from the media has been validated.

13. The media drive of claim 12 wherein the compressed data is encrypted.

14. The media drive of claim 12 wherein the drive side circuitry has a speed at which it can validate compressed data approximately equal to a native speed of the media.

15. The media drive of claim 12 wherein the drive side circuitry is further configured to, in response to detecting an unrecoverable corrupt one of the packets, generate a message indicating that the compressed data read from the media cannot be validated.

16. The media drive of claim 12 further comprising server side circuitry, wherein the drive side circuitry is further configured to forward the message to the server side circuitry.

17. The media drive of claim 16 wherein the server side circuitry includes a digital interface adapter.

* * * * *